United States Patent
Leclercq et al.

(10) Patent No.: US 9,191,778 B2
(45) Date of Patent: *Nov. 17, 2015

(54) METHOD AND SYSTEM FOR GLOBAL NAVIGATION SATELLITE SYSTEM CONFIGURATION OF WIRELESS COMMUNICATION APPLICATIONS

(71) Applicant: Maxlinear, Inc., Carlsbad, CA (US)

(72) Inventors: Maxime Leclercq, Carlsbad, CA (US); Ioannis Spyropoulos, Carlsbad, CA (US); Nishant Kumar, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/284,606

(22) Filed: May 22, 2014

(65) Prior Publication Data

US 2014/0256362 A1    Sep. 11, 2014

Related U.S. Application Data

(63) Continuation of application No. 13/540,957, filed on Jul. 3, 2012, now Pat. No. 8,738,034.

(60) Provisional application No. 61/505,450, filed on Jul. 7, 2011, provisional application No. 61/552,718, filed on Oct. 28, 2011, provisional application No. 61/552,729, filed on Oct. 28, 2011, provisional application No. 61/623,533, filed on Apr. 12, 2012, provisional application No. 61/663,767, filed on Jun. 25, 2012.

(51) Int. Cl.
*H04W 24/00* (2009.01)
*H04W 4/02* (2009.01)
*G01S 5/02* (2010.01)
*H04W 64/00* (2009.01)
*H04W 4/00* (2009.01)
*H04M 1/725* (2006.01)

(52) U.S. Cl.
CPC .. *H04W 4/02* (2013.01); *G01S 5/02* (2013.01); *H04W 64/006* (2013.01); *H04M 1/72572* (2013.01); *H04W 4/001* (2013.01)

(58) Field of Classification Search
USPC ......... 455/456.1–456.6, 41.2–41.3, 418–420, 455/553.1, 556.2
See application file for complete search history.

(56) References Cited

U.S. PATENT DOCUMENTS

| | | | | |
|---|---|---|---|---|
| 7,042,392 | B2 * | 5/2006 | Whelan et al. | 342/357.29 |
| 8,738,034 | B2 * | 5/2014 | Leclercq et al. | 455/456.1 |
| 2010/0265128 | A1 * | 10/2010 | Martens et al. | 342/357.25 |
| 2011/0258076 | A1 * | 10/2011 | Muirbrook | 705/26.41 |

* cited by examiner

*Primary Examiner* — Brandon Miller
(74) *Attorney, Agent, or Firm* — McAndrews, Held & Malloy

(57) ABSTRACT

Methods and systems for global positioning navigate satellite system configuration of wireless communication applications may comprise in a wireless communication device (WCD) comprising a satellite positioning RF path, determining a location of the WCD utilizing LEO signals received by said satellite positioning RF path, establishing communications with a wireless access point based on the determined location, and configuring a wireless communication function of the WCD based on the determined location. The wireless communication function may comprise a power level of wireless local area network circuitry in the WCD, a point-of-sale transaction, or a synchronization of data on the WCD with one or more devices in a home location of the WCD. The determined location and a transaction ID for the point-of-sale transaction may be stored utilizing a security processor in the WCD. The satellite positioning RF path may be powered down based on the determined location.

20 Claims, 10 Drawing Sheets

METHOD AND SYSTEM FOR GLOBAL NAVIGATION SATELLITE SYSTEM CONFIGURATION OF WIRELESS COMMUNICATION APPLICATIONS

CROSS-REFERENCE TO RELATED APPLICATIONS/INCORPORATION BY REFERENCE

This application is a continuation of application Ser. No. 13/540,957 filed on Jul. 3, 2012, which in turn makes reference to, claims priority to U.S. Provisional Application Ser. No. 61/505,450 filed on Jul. 7, 2011, U.S. Provisional Application No. 61/552,718 filed on Oct. 28, 2011, U.S. Provisional Application No. 61/552,729 filed on Oct. 28, 2011, U.S. Provisional Application No. 61/623,533 filed on Apr. 12, 2012, and U.S. Provisional Application No. 61/663,767 filed on Jun. 25, 2012.

This application also makes reference to U.S. application Ser. No. 12/965,805 filed on Dec. 10, 2010.

Each of the above indicated applications is hereby incorporated herein by reference in its entirety.

FIELD OF THE INVENTION

Certain embodiments of the invention relate to wireless communication. More specifically, certain embodiments of the invention relate to a method and system for global navigation satellite system configuration of wireless communication applications.

BACKGROUND OF THE INVENTION

Global navigation satellite systems (GNSS) such as the NAVSTAR global positioning system (GPS) or the Russian GLONASS provide accurate positioning information for a user anywhere on Earth that GNSS signals may be received. GNSS satellites are medium earth orbit satellites, about 12,000 miles above the surface. Highly accurate GNSS clock signals from these satellites may be used to accurately determine the position of a receiver.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for global navigation satellite system configuration of wireless communication applications, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for global navigation satellite system configuration of wireless communication applications. Exemplary aspects of the invention may comprise determining a location of a wireless communication device comprising a medium Earth orbit (MEO) radio frequency (RF) path and a low Earth orbit (LEO) RF path utilizing LEO signals received by the LEO RF path. A wireless communication function of the wireless communication device may be configured based on the determined location. The wireless communication function may comprise a power level of WiFi circuitry in the wireless communication device or a point-of-sale transaction. The determined location and a transaction ID for the point-of-sale transaction may be stored utilizing a security processor in the wireless communication device. The MEO RF path may be powered down based on the determined location. The wireless communication function may comprise a synchronization of data on the wireless communication device with one or more devices in a home location of the wireless communication device. The wireless communication device may comprise a femtocell device or a set-top box. In-phase and quadrature signals may be processed in the MEO RF path and/or the LEO RF path. The wireless communication device may be controlled by a reduced instruction set computing (RISC) central processing unit (CPU).

Figure 1A:
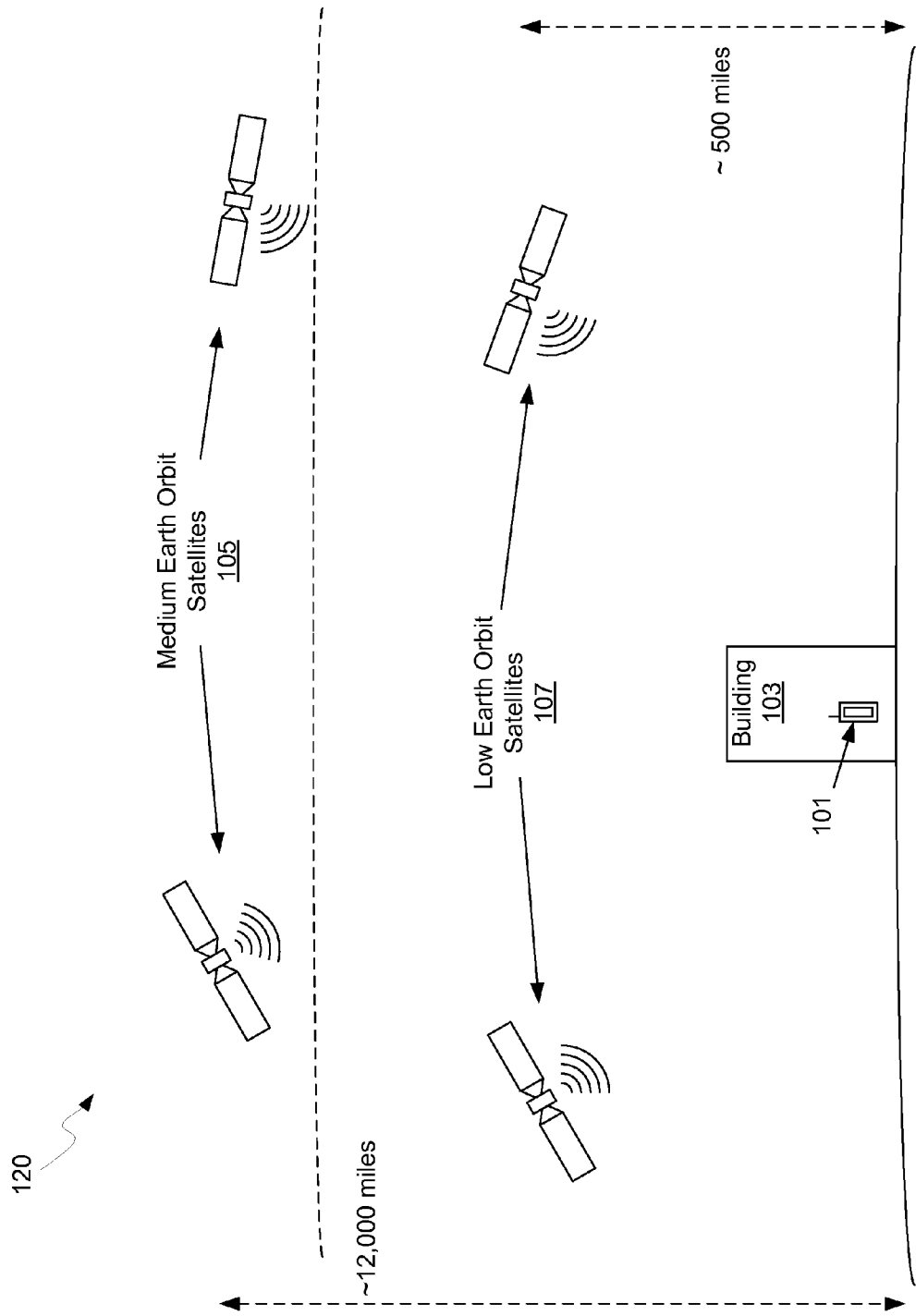
FIG. 1A is a diagram illustrating an exemplary wireless device with a global navigation satellite system, in accordance with an embodiment of the invention.

FIG. 1A is a diagram illustrating an exemplary wireless device with a global navigation satellite system, in accordance with an embodiment of the invention. Referring to FIG. 1A, there is shown a satellite navigation system 100 comprising a handheld communication device 101, a building 103, medium Earth orbit (MEO) satellites 105, and low Earth orbit (LEO) satellites 107. There is also shown the approximate height in miles of medium Earth and low Earth satellites of ~12,000 miles and ~500 miles, respectively.

The handheld communication device 101 may comprise any device or vehicle (e.g. smart phone) where its user may desire to know the location of such device or vehicle. The handheld communication device 101 may comprise a global navigation satellite system (GNSS) receiver having a configurable RF path that may be operable to receive medium Earth orbit (MEO) satellite signals and low Earth orbit (LEO) satellite signals. In another exemplary scenario, the wireless device 101 may comprise two RF paths to receive different satellite signals.

The MEO satellites 105 may be at a height of about 12,000 miles above the surface of the Earth, compared to about 500 miles above the surface for the LEO satellites 107. Therefore, the signal strength of LEO satellite signals is much stronger than MEO satellite signals. The LEO satellites 107 may typically be used for telecommunication systems, such as satellite phones, whereas the MEO satellites 105 may be utilized for location and navigation applications.

In certain circumstances, MEO signals, such as GPS signals, may be attenuated by buildings or other structures to such an extent that GPS receivers cannot obtain a lock to any GPS satellites. However, due to the stronger signal strength of LEO satellite signals, the LEO signals may be utilized by devices to supplement or substitute the MEO systems in the devices. However, the frequencies utilized for MEO and LEO satellite communication are not the same, so a conventional GPS receiver cannot process LEO signals such as Iridium signals.

In an exemplary embodiment, the wireless device 101 may be operable to receive both LEO satellite signals, such as Iridium signals, and MEO signals, such as GPS signals. In this manner, the receiver may be able to determine the user's location despite having high attenuation of GPS signals to below that of the sensitivity of the receiver. Thus, the handheld communication device 101 may be able to accurately determine its location by receiving either or both Iridium and GPS satellite signals. This may be enabled by utilizing separate RF paths, one path configured to receive MEO signals and the other path configured to receive LEO satellite signals.

In an exemplary scenario, the two separate RF paths may share some front-end components, such as an antenna, low-noise amplifier (LNA), and a splitter, for example. In this scenario, the shared front-end components may comprise enough bandwidth to process both MEO and LEO signals. In another exemplary scenario, the wireless device may utilize separate front-end components. Furthermore, in instances where only one type of signal is to be received, the inactive RF path may be powered down to conserve power.

In yet another exemplary scenario, the separate RF paths may be time-division duplexed (TDD), or selectively enabled, such that both MEO and LEO signals may be received, but at alternating times. This may enable MEO-assisted LEO positioning or LEO-assisted MEO positioning, for example. The wireless device 101 may comprise a blanking or switching module for enabling TDD signal reception, where the TDD process may be carried out in the digital domain. For example, the MEO, or GPS, processing path may be blanked, i.e. set to and held at the last sampled value, while the LEO path receives and demodulates LEO signals.

Determining the location of the wireless device using stronger LEO satellite signals, particularly when coarse location is acceptable, uses much less power than weaker MEO (e.g. GPS) satellite signals, particularly with fine location calculations. Further power savings may be enabled by disabling WiFi RF and processor circuitry in the wireless device by configuring the WiFi circuitry to only activate when in the vicinity of a known or trusted WLAN (e.g. WiFi) provider, such as at home and work locations. Trusted WLAN may comprise networks where the user of the wireless device has an authorized account, such as at a home or work location, or at a location frequented by the user, such as a coffee shop or hotel.

In yet another exemplary scenario, in many devices such as a smartphone, tablet, laptop or camera, it may be desirable to upload or download data acquired by the device to or from other devices such as a laptop or server at a particular location such as a home or office, for other purposes such as viewing, processing or editing. This process is referred to hereinafter as "syncing." Traditionally, this is done through WiFi connectivity, wherein a device detects and associates with a WiFi access point, and the user initiates a transfer. This is cumbersome because it requires user intervention, and also incurs a power dissipation penalty in the device which must activate the WiFi to constantly sense whether it is within range of the home or office access point. In an exemplary scenario, the MEO and LEO positioning ability of the wireless device 101 may enable automated syncing in order to make a device more convenient for end users and more power efficient.

Figure 1B:
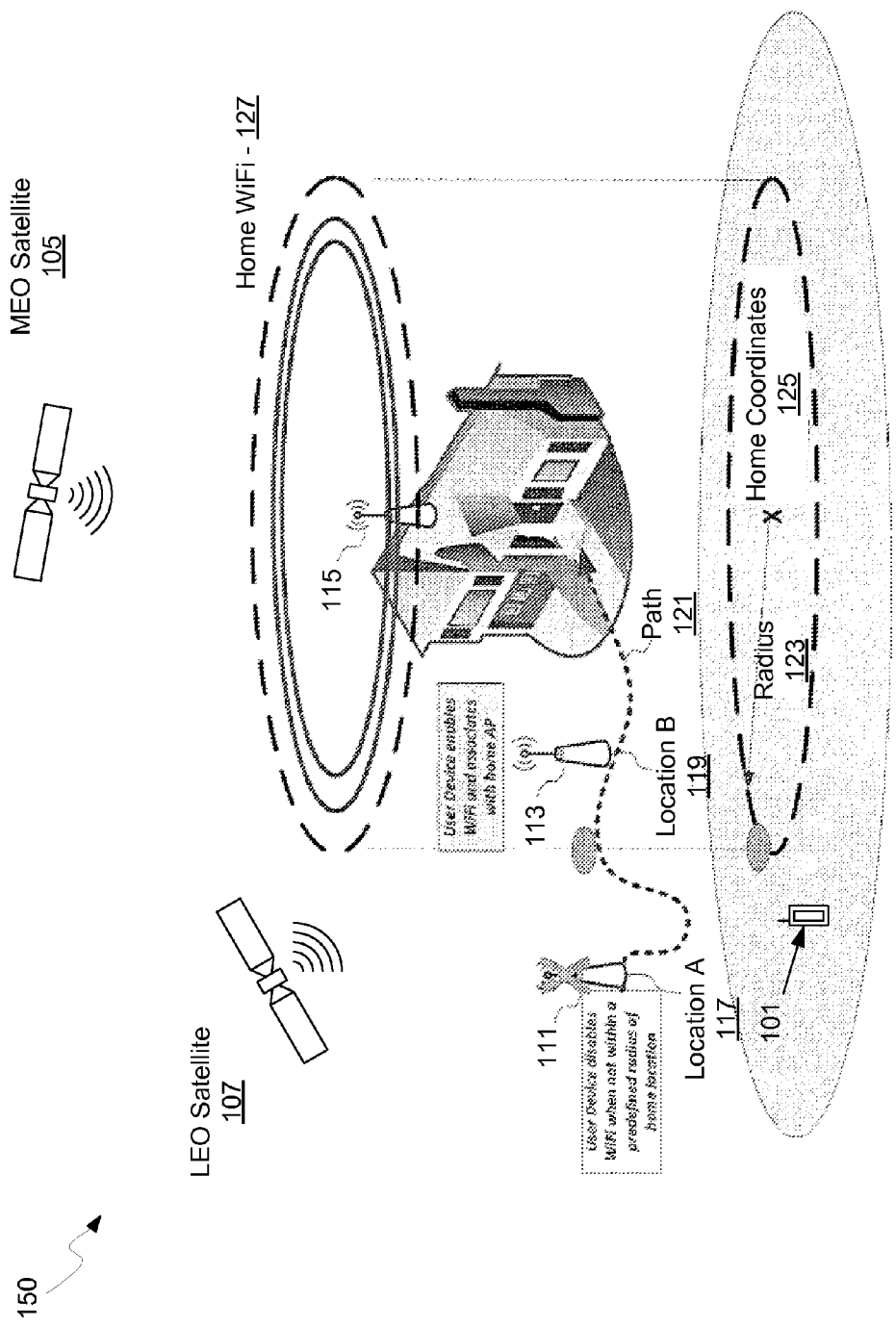
FIG. 1B is a block diagram of an exemplary dual mode global navigation satellite system for configuring wireless applications in accordance with an embodiment of the invention.

FIG. 1B is a block diagram of an exemplary dual mode global navigation satellite system for configuring wireless applications in accordance with an embodiment of the invention. Referring to FIG. 1B, there is shown a satellite positioning automated syncing system 150 comprising the wireless device 101, MEO satellites 105, LEO satellites 107, access point 111 at location A 117, access point 113 at location B 119, a path 121 followed by the user of the wireless device 101, a radius 123 around the home coordinates 125, and a home WiFi network 127.

In this application, it is understood that "sync" refers to the process of exchanging data between applications running on two or more devices to update one or more devices with new or altered information, including pictures, audio files, or other digital data. A "user device" refers to a device such as a mobile phone, smart phone, table, laptop, or camera; "base location" refers to a home, office or other location which has a wireless network and which the user can designate as a location where syncing should automatically take place; "WiFi" can refer to an 802.11-based wireless connectivity standard, or any wireless connectivity standard suitable for data transfer. "WiFi access point" can variously refer to a WiFi access point or the basic services set or extended services set associated with the access point. Where an access point is not necessary, as in the case of ad hoc networks and WiFi Direct, the access point simply refers to the WiFi connectivity device at the base location. Base access point refers to the WiFi access point that is located at the base location and is designated for autonomous connection with the user device.

The wireless device 101 may sense when it is within a predetermined proximity, such as within the radius 123 of a plurality of designated home coordinates 125. If it is out of range, it may automatically disable the WiFi connectivity, unless this is superseded by user preferences. If the wireless device 101 is within range of a particular home coordinate 125, it may automatically enable WiFi connectivity determined from a database on the wireless device 101 which access point 113 is present at that coordinate and automatically associates with that access point 113. It then may perform a predetermined set of instructions such as downloading or uploading files.

The association function of the wireless device may comprise automatically associating the position of the base location with the WiFi access point 113 and receiving an indication from the user that automatic syncing is desirable through the WiFi access point 113 to one or more applications running on one or more servers. The wireless device 101 may store the location B 119 and WiFi access point 113 information in a database for future use.

The autosync function of the wireless device 101 may comprise detecting when it is within proximity of the base location B 119. The wireless device 101 may then autonomously activate its WiFi circuitry to sense the base access point 113 and associate with it. Once the association is complete, the wireless device 101 may automatically connect to a server and then trigger the applications running on the user device and server to sync with each other.

In an exemplary scenario, the automated connection and triggering may be driven through a script. For example, when the wireless device 101 returns home, the wireless device 101 may recognize that it is in proximity to the home coordinates 125, automatically associate with the home WiFi access point 113, establish a connection to a home server, prompt the user for biometric authentication, and upon successful authentication, unlock the door closest to the user's position, e.g., the front door or garage.

In another exemplary scenario, the wireless device 101 may initiate an automatic photo sync of photos generated by its camera, or even from a standalone camera with network capabilities. When the user of the wireless device 101, or camera, returns home with new photos, the device may sense that it is in proximity of home coordinates 125, wake its WiFi circuitry, and associate with the home WiFi access point 113 or connect by ad hoc means. The wireless device 101 or camera may then initiate a photo upload to a device within the home without user intervention.

Figure 1C:
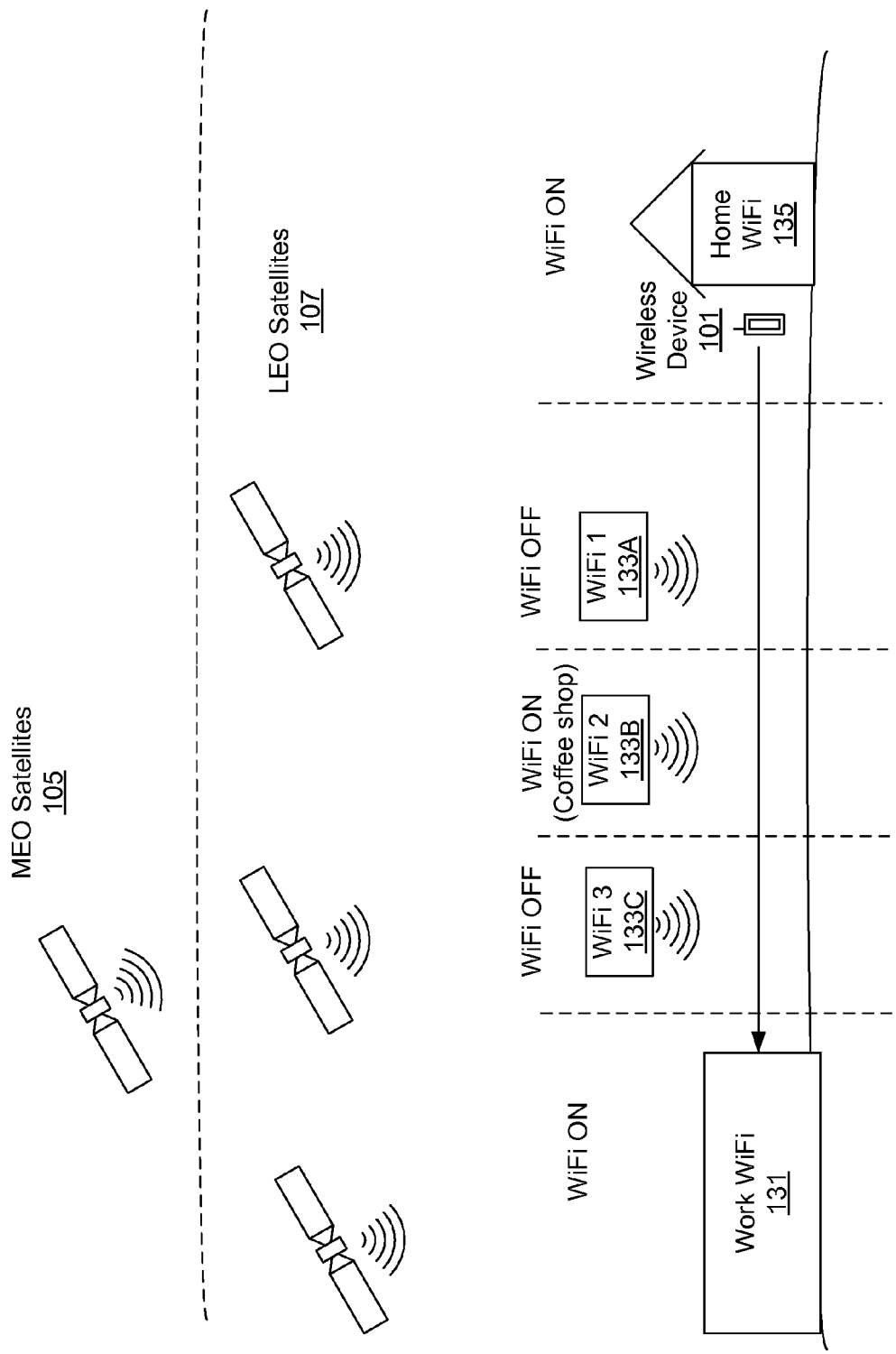
FIG. 1C is a schematic illustrating ultra-low power tracking utilizing low Earth orbit satellite signals, in accordance with an embodiment of the invention.

FIG. 1C is a schematic illustrating ultra-low power tracking utilizing low Earth orbit satellite signals, in accordance with an embodiment of the invention. Referring to FIG. 1C, there is shown the wireless device 101, MEO satellites 105, LEO satellites 107, a home WiFi network 135, WiFi access points 133A-133C located along the commute from home to work, and a work WiFi network 131.

In an exemplary scenario, a plurality of bursts from the LEO satellites 107 may be received by the wireless device 101 over a few seconds. The bursts may be down-converted and demodulated to extract an accurate clock that may calibrate local oscillators or crystal oscillators and therefore reduce the GNSS (e.g. GPS) acquisition time. Furthermore, the interval between LEO bursts may be compared to the expected interval, which is known for each satellite based on its satellite ID extracted from the demodulated signal, to calculate for the unknown Doppler shift, which in turn may be utilized to calculate a location of the wireless device 101.

The wireless device 101 may receive MEO and/or LEO signals and may demodulate the received signal to an accurate clock from the transmitting satellite. This accurate clock along with information regarding the satellite orbit may be utilized for positioning. In this manner either MEO or LEO signals, or both, may be utilized for positioning purposes.

In instances when the wireless device 101 is located in the vicinity of a known and/or trusted WiFi network, such as the home WiFi network 135, the coffee shop WiFi 133B, or the work WiFi network 131, the wireless device 101 may configure its WiFi circuitry in a powered-up state. However, when the user is on the commute from the home to work and not near a known and/or trusted WiFi network, the wireless device 101 may deactivate or put the WiFi circuitry in the wireless device 101 in a standby mode, effectively ignoring the WiFi 133A and 133C access points. Accordingly, the power level of WiFi circuitry in the wireless device 101 may be configured based on the proximity to desired and/or trusted WiFi locations. For example, the WiFi circuitry may be completely powered down, or may be placed in a low-power idle state, depending on desired power usage and speed of restart, for example. Furthermore, the network search and association function of the WiFi circuitry may be configured in a low-power mode for the adjusting of the power level.

Similarly, if fine location determination is not needed, the wireless device 101 may also disable its MEO (e.g. GPS) location circuitry, or put it in a standby mode, during the commute between home and work. During this time, the LEO satellite signals may be utilized to determine the location of the wireless device 101. Of course, the MEO location circuitry disabling may be overridden by the user if desired.

Figure 1D:
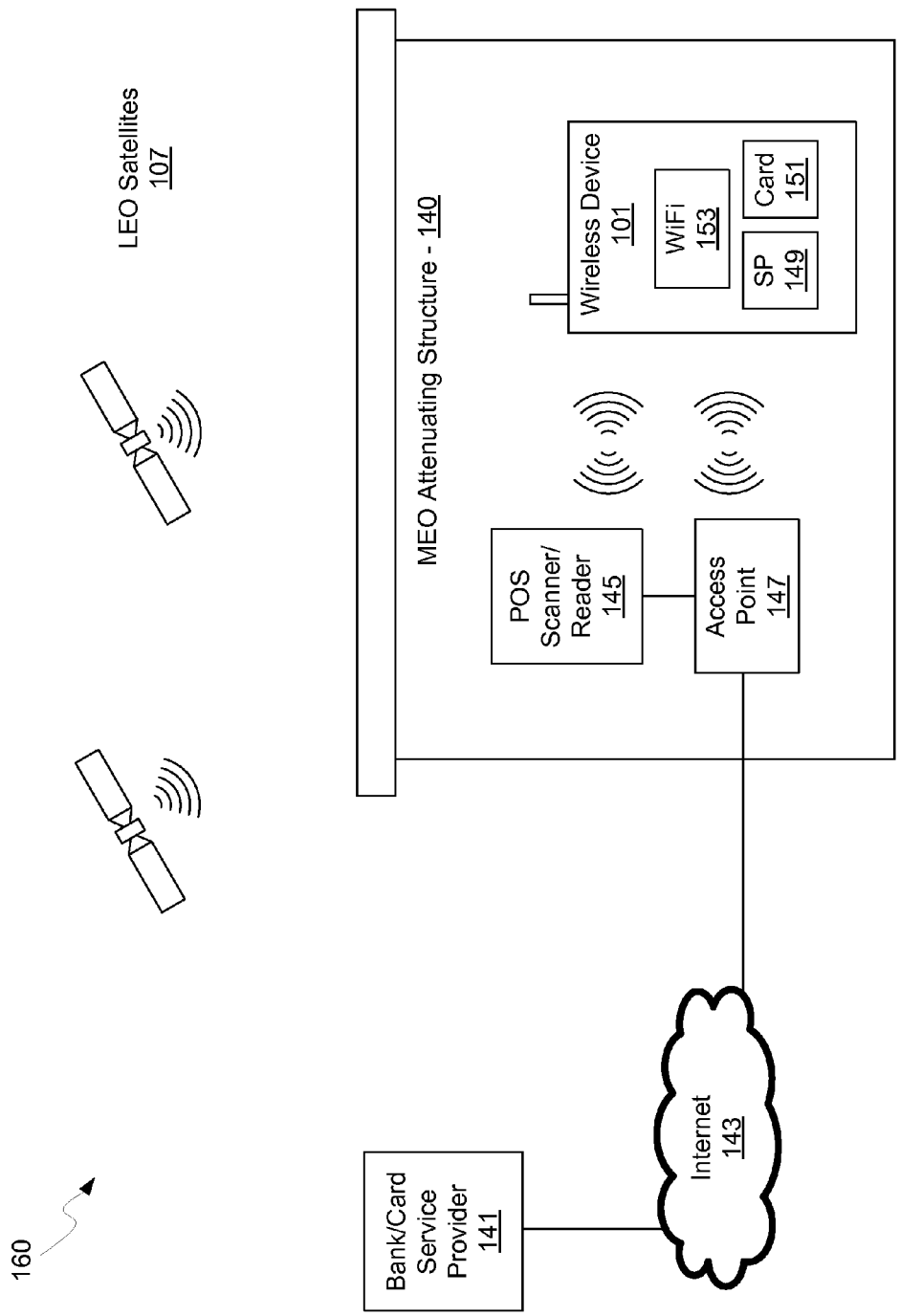
FIG. 1D is a schematic illustrating an exemplary point-of-sale positioning, in accordance with an embodiment of the invention.

FIG. 1D is a schematic illustrating an exemplary point-of-sale positioning, in accordance with an embodiment of the invention. Referring to FIG. 1D, there is shown a point-of-sale (POS) transaction 160 comprising a MEO attenuating structure 140, the Internet 143, a bank/card service provider 141, the LEO satellites 107. Within the MEO attenuating structure 140 is the wireless device 101, a point-of-sale scanner/reader 145, and an access point 147. The MEO attenuating structure 140 may comprise a building, for example, where MEO satellite signals are attenuated such that positioning is inaccurate or impossible due to weak signals. In this instance, LEO satellite signals may be utilized for positioning.

The wireless device 101 may comprise a security processor 149, an identifying card 151, and WiFi circuitry 153. In an exemplary scenario, the security processer 149 may comprise suitable circuitry, logic, and/or code that may be operable to determine the position of the wireless device and perform transactions with devices such as the POS scanner/reader 145, for example. The wireless device 101 may also comprise a card 151, such as a SIM card, that may be utilized to store the transaction ID and corresponding location information in point-of-sale (POS) transactions. This may provide enhanced transaction security, as the SIM card 151 and its location may be used to confirm transactions on a bill, for example.

As shown in FIG. 1D, the wireless device 101 may be within a structure 140 that attenuates MEO satellite signals below a threshold level needed for MEO positioning purposes. Accordingly, the wireless device 101 may utilize LEO satellite signals for positioning purposes. In another exemplary scenario, the wireless device 101 may configure its WiFi circuitry 153 based on its position as determined by LEO satellite signals. For example, if the MEO attenuating structure 140 is a coffee shop frequented by the user of the wireless device 101, the access point 147 may be utilized for communication purposes.

In an exemplary scenario, the wireless device 101 may be utilized for POS communications. For example, the wireless device 101 may communicate with the POS scanner/reader 145 to complete a purchase or other transaction, and may determine its position utilizing LEO signals. The position may then be encrypted, signed, and passed along with the transaction ID to the POS scanner/reader 145 and ultimately to bank or card service provider 141, for example, via the Internet 143, or alternatively via phone lines.

The security processor 149 may securely calculate the position of the wireless device 101 based on LEO satellite signals, perform the encryption and signing, and communicate the information to the bank/card service provider 141. In addition, the security processor 149 may securely store the transaction information in the SIM card 151. In another exemplary scenario, the security processor 149 may store the transaction information in a non-volatile memory in the wireless device 101.

Figure 1E:
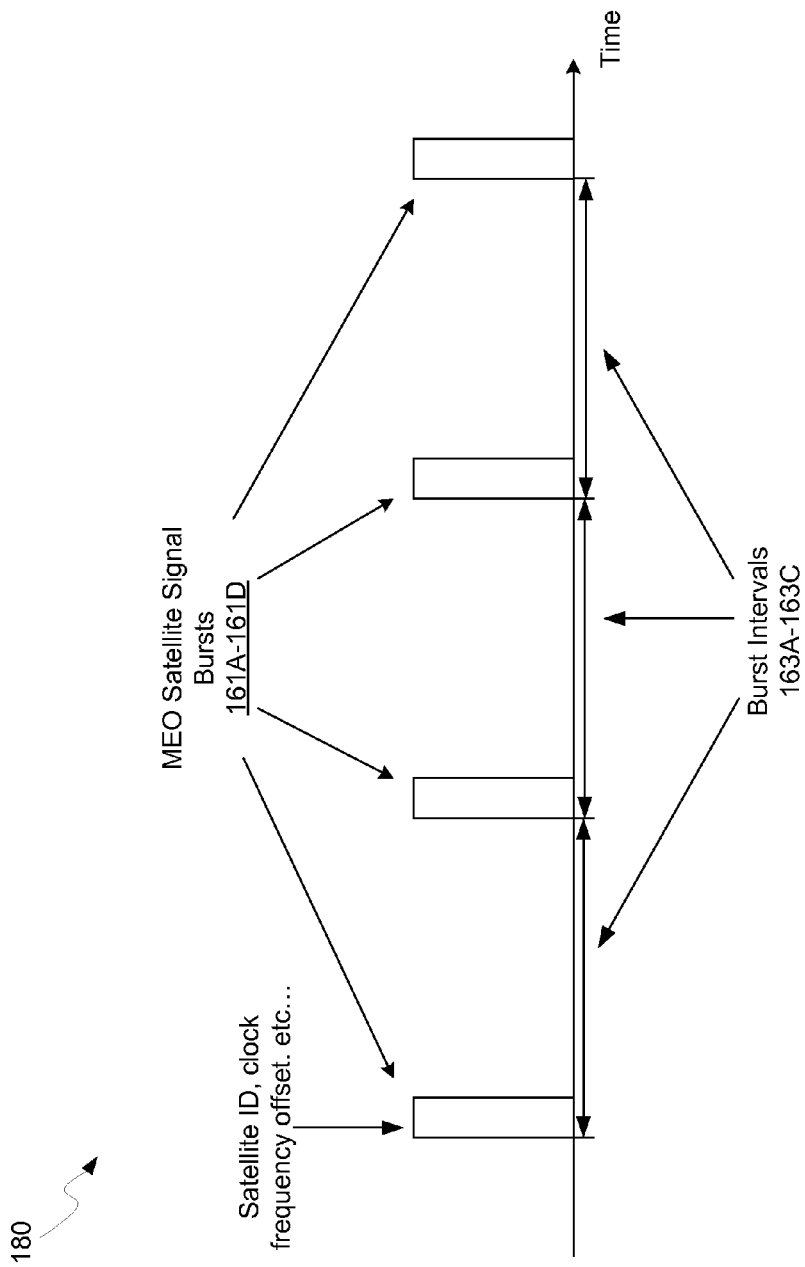
FIG. 1E is a schematic illustrating a timing diagram for low Earth orbit satellite signals, in accordance with an embodiment of the invention.

FIG. 1E is a schematic illustrating a timing diagram for low Earth orbit satellite signals, in accordance with an embodiment of the invention. Referring to FIG. 1E, there is shown a satellite timing diagram 180 comprising four LEO satellite signal bursts 161A-161D separated in time by the burst intervals 163A-163C. In an exemplary scenario, a dual mode or time-division duplexed MEO/LEO RF receiver may receive the LEO bursts and demodulate them to obtain the satellite ID and the clock frequency offset. From the satellite ID, the receiver then has knowledge of that satellite's expected burst interval. By comparing the expected burst interval to the measured interval, the receiver then may calculate the Doppler shift. Each of these pieces of information may be utilized to assist the MEO position calculation (e.g. GPS). Alternatively, the MEO satellite signal burst calibration may be utilized to keep the receiver TCXO calibrated while leaving the MEO (GPS) system powered down.

Figure 2A:
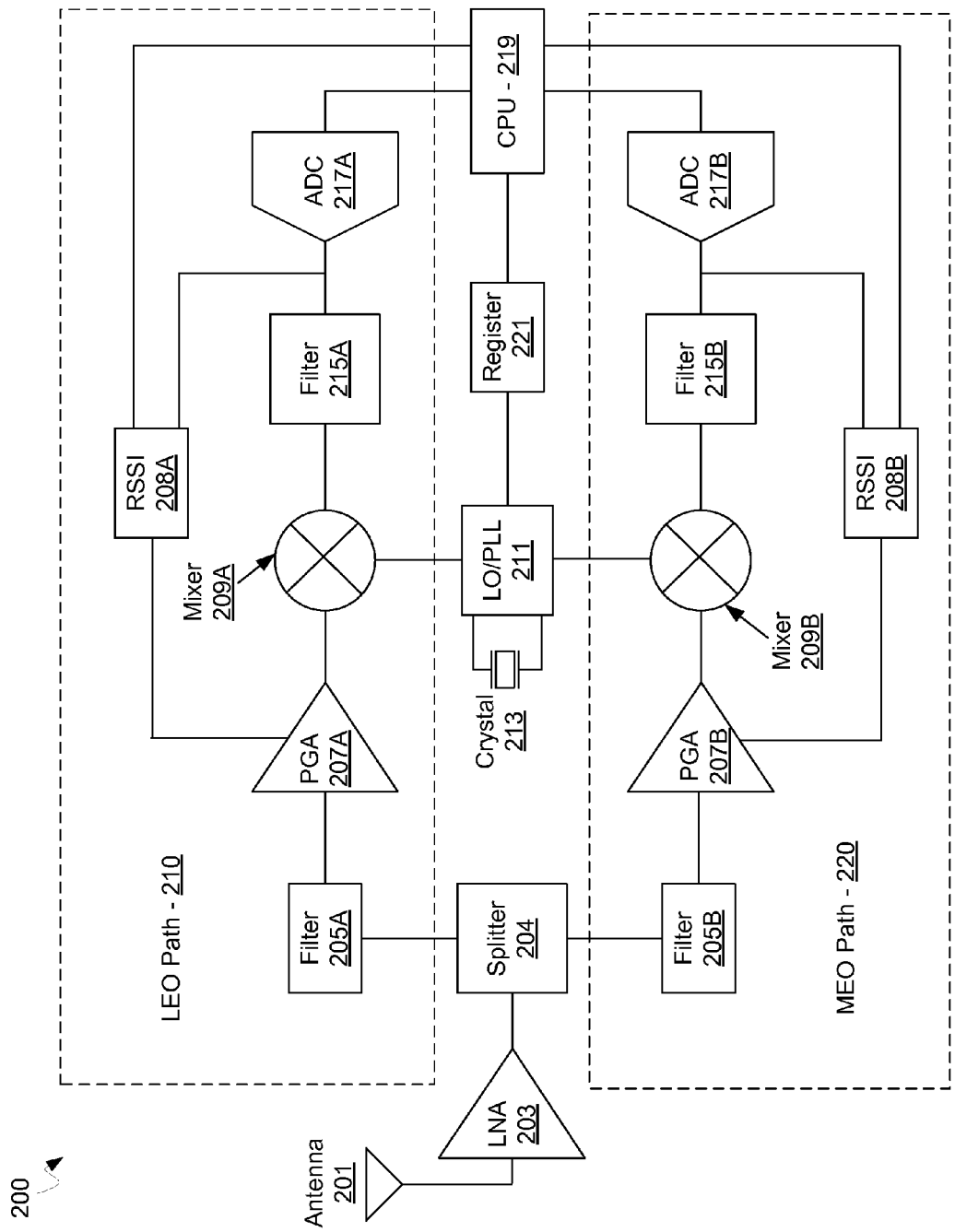
FIG. 2A is a diagram illustrating an exemplary dual mode radio frequency receiver, in accordance with an embodiment of the invention.

FIG. 2A is a diagram illustrating an exemplary dual mode radio frequency receiver, in accordance with an embodiment of the invention. Referring to FIG. 2, there is shown a receiver 200 comprising an antenna 201, a low noise amplifier (LNA) 203, a signal splitter 204, a LEO path 210, a MEO path 220, a local oscillator (LO)/phase locked loop (PLL) 211, a crystal oscillator 213, a central processing unit 219, and a register 221.

The LEO path 210 and MEO path 220 may comprise similar components, configured for different frequencies as needed, such as a programmable gain amplifiers (PGAs) 207A and 207B, receive signal strength indicator modules (RSSI) 208A and 208B, mixers 209A and 209B, filters 215A and 215B, and analog-to-digital converters (ADCs) 217A and 217B.

The antenna 201 may be operable to receive RF signals for subsequent processing by the other elements of the receiver 200. The antenna 201 may comprise a single antenna with wide enough bandwidth to receive both LEO and MEO signals, may comprise a tunable antenna to cover the desired frequency range, or may comprise more than one antenna for receiving signals, each for receiving signals in one of a plurality of frequency ranges.

The LNA 203 may be operable to provide amplification to the signals received by the antenna 201, with the amplified signal being communicated to the splitter 204. The LNA 203 may have a wide enough bandwidth to amplify both MEO and LEO satellite signals.

The signal splitter 204 may be operable to communicate part of the signal received from the antenna 201 to the LEO path 210 and part to the MEO path 220. This may be achieved by splitting the signal at a certain percentage to each path, such as 50%/50%, for example, or may split the received RF signal based on frequency, such that only MEO signals are communicated to the MEO path 220 and only LEO signals are communicated to the LEO path 210.

The filters 205A and 205B may comprise active or passive filters and may be operable to attenuate signals at frequencies outside a desired range and allow desired signals to path. For example, the filter 205A may pass LEO satellite signals while filtering out MEO signals.

The PGAs 207A and 207B may provide amplification to signals received from the filters 205A and 205B, and may be configured to operate at MEO or LEO frequencies, or may operate over both frequency ranges, for example. The PGA 207 may be configured by a processor, such as the CPU 219.

The filter modules 205A and 205B may comprise active and/or passive filters for removing unwanted signals while allowing desired signals to pass to the PGAs 207A and 207B.

In an exemplary scenario, the filter modules 205A and 205B comprises surface acoustic wave (SAW) filters.

The RSSI modules 208A and 208B may comprise circuitry for determining the magnitude of a received signal, and may sense signal strengths at the PGAs 207A or 207B or for down-converted signals after the filters 215A and 215B, for example. Accordingly, the RSSI modules 208A and 208B may be operable to sense signal strength at any point along the RF paths in the receiver 200.

The mixers 209A and 209B may comprise circuitry that is operable to generate output signals at frequencies that are the sum and the difference between the input RF signals and the local oscillator signal received from the LO/PLL 211. In an exemplary scenario, the LEO path 210 and the MEO path 220 may comprise two paths each to enable the reception of in-phase and quadrature (I and Q) signals. Accordingly, the mixers 209A and 209B may each comprise two mixers, each receiving LO signals with 90 degree phase difference to the other mixer of the pair.

In another exemplary scenario, the mixer 209 may down-convert the received RF signals to an intermediate frequency (IF) for further processing, as opposed to down-converting directly to baseband. In this scenario, the filter modules 215A and 215B may comprise a bandpass filter that is configured to pass the desired IF signals while filtering out the undesired low and high frequency signals.

The LO/PLL 211 may comprise circuitry that is operable to generate RF signals to enable down-conversion of RF signals received by the mixers 209A and 209B. The LO/PLL 211 may comprise a voltage-controlled oscillator, for example, with a PLL to stabilize the frequency of the output signal communicated to the mixers 209A and 209B. In an exemplary scenario, the LO/PLL 211 may generate a plurality of LO signals for down-converting I and Q signals in the LEO path 210 and the MEO path 220.

The crystal oscillator 213 may comprise a stable clock source for the receiver 200, and may comprise a piezoelectric crystal, for example, that outputs a stable clock signal at a given temperature. The crystal oscillator 213 may comprise a source for the various LO signals to be communicated to the mixers via the LO/PLL 211.

The ADCs 217A and 217B may comprise circuitry that is operable to convert analog input signals to digital output signals. Accordingly, the ADCs 217A and 217B may receive baseband or IF analog signals from the mixers 209A and 209B and may generate digital signals to be communicated to the CPU 219.

The CPU 219 may comprise a processor similar to the processor 113, for example, described with respect to FIG. 1B. Accordingly, the CPU 219 may be operable to control the functions of the receiver 200 and may process received baseband or IF signals to demodulate, decode, and/or perform other processing techniques to the received data. Other processing techniques may comprise positioning calculations based on received satellite signals. The CPU 219 may thus be operable to demodulate and decode both MEO and LEO satellite data, such as GPS and Iridium data.

The CPU 219 may receive RSSI information from the RSSI modules 208A and 208B and may control the gain of the various gain stages in the Rx paths. Similarly, the CPU may control the LO/PLL 211 via the register 221.

The register 221 may comprise a memory register for storing a configuration to be communicated to the LO/PLL to down-convert MEO and/or LEO signals. The register 221 may communicate an output signal to the LO/PLL 211 that indicates the desired frequency signals to down-convert to received RF signals to IF or baseband.

In an exemplary scenario, the receiver 200 may be operable to receive both MEO and LEO satellite signals for positioning purposes. In this manner, the wireless device that comprises the receiver 200 may be capable of determining its position even within a structure that attenuates GPS signals. Accordingly, a plurality of positioning-based applications may be performed. For example, the positioning function may be operable to power on and off WiFi circuitry based on the known locations of trusted WiFi networks and a determined position of the wireless device using LEO satellite signals.

Similarly, the receiver 200 may enable a wireless device to sync data acquired by the device to or from other devices such as a laptop or server at a particular location determined by LEO/MEO positioning for other purposes such as viewing, processing or editing. In an exemplary scenario, the MEO and LEO positioning enabled by the receiver 200 may enable automated syncing of the data in the wireless device when at a location with a known/trusted WiFi network in order to make a device more convenient for end users and more power efficient.

In yet another exemplary scenario, the receiver 200 may enable MEO and LEO positioning for point-of-sale transaction security. Accordingly, the receiver 200 may receive LEO signals when MEO signals are insufficient, such as when the receiver 200 is within a building, and determine a location that may be stored along with other transaction details for enhanced security.

Figure 2B:
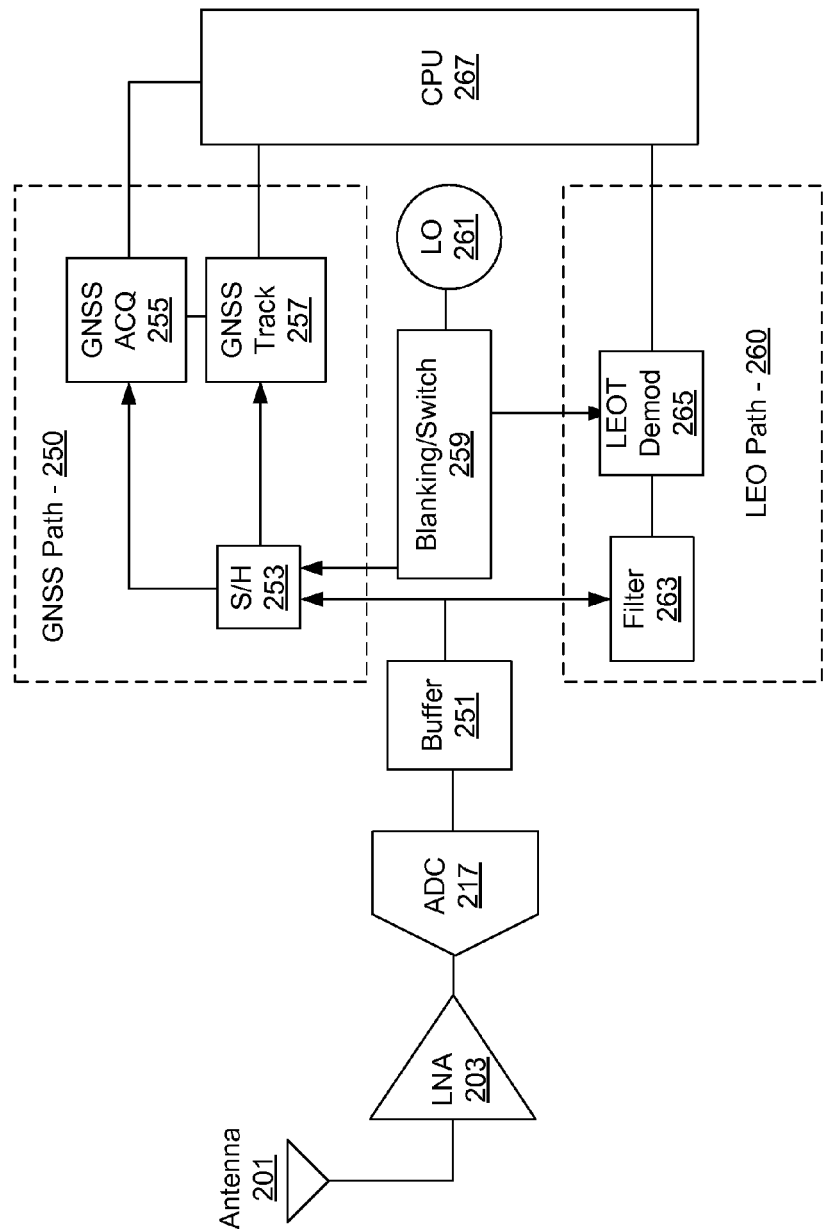
FIG. 2B is a block diagram illustrating a dual-mode time-division duplex satellite receiver, in accordance with an embodiment of the invention.

FIG. 2B is a block diagram illustrating a dual-mode time-division duplex satellite receiver, in accordance with an embodiment of the invention. Referring to FIG. 2B, there is shown an exemplary receiver 250 comprising an antenna 201, a low-noise amplifier (LNA) 203, an analog-to-digital converter (A/D) 217, a buffer 251, and two paths, a MEO path 250, and a LEO path 260. There is also shown a blanking/switch module 259, a LO/PLL 261 and a central processing unit (CPU) 267.

The MEO path 250 may comprise a sample and hold (S/H) module 253, a GNSS acquisition module 255, and a GNSS tracking module 257. The S/H module 253 may be operable to sample the digital signal from the buffer 251, and hold the sampled value for a configurable time, which may be communicated to the GNSS acquisition module 255 and the GNSS tracking module 257. The S/H module 253 may thus act as a gatekeeper for data to the GNSS acquisition module 255 and the GNSS tracking module 257. This may enable the receiver 250 to switch between MEO and LEO signals without losing a MEO value when receiving LEO signals, for example, and avoid the divergence of the output of the GNSS acquisition module 255 and the GNSS tracking module 257. In another exemplary scenario, the S/H module 253 may output a constant value, a string of zeroes, for example, or any known patter to avoid divergence of the output of the GNSS acquisition module 255 and the GNSS tracking module 257.

The GNSS acquisition module 255 may be operable to acquire a lock to one or more GNSS satellites, which may allow the GNSS tracking module 257 to determine and track the location of the receiver. The GNSS acquisition module 255 may detect LEO frequency signals above a threshold signal strength and extract an accurate clock by determining the code-division multiple access (CDMA) collision avoidance (CA) code for the received data. A determined satellite ID and C code may be used by the GNSS tracking module 257 for accurate positioning purposes.

Similarly, the LEO path 260 may comprise a filter 263 and a LEO timing signal demodulator module 265. The LEO timing signal demodulator module 265 may receive filtered MEO signals from the filter 263 and may demodulate the received signal to an accurate clock from the transmitting satellite. This accurate clock along with information regarding the satellite orbit may be utilized for positioning. In this manner either MEC or LEO signals, or both, may be utilized for positioning purposes.

The LEO timing demodulator 265, the GNSS acquisition module 255, and the GNSS tracking module 257 may communicate output signals to the CPU for further processing or use of the determined timing and/or positioning data.

The blanking/switching module 259 may be operable to provide the TDD function for the receiver, switching the LEO path 260 on and off and blanking the MEO path 250 by configuring the output of the S/H module 253 to retain the previous data to the GNSS acquisition module. The LO/PLL 261 may provide a timing signal for the blanking/switch module.

The filter 263 may be operable to filter out unwanted signals allowing the desired satellite RF signal to pass to the LEOT demodulator module 265. The LEO timing demodulator may be operable to extract an accurate timing signal from the received LEO signals, which along with satellite ephemeris data, may be utilized by the CPU 267 for positioning purposes.

Figure 3:
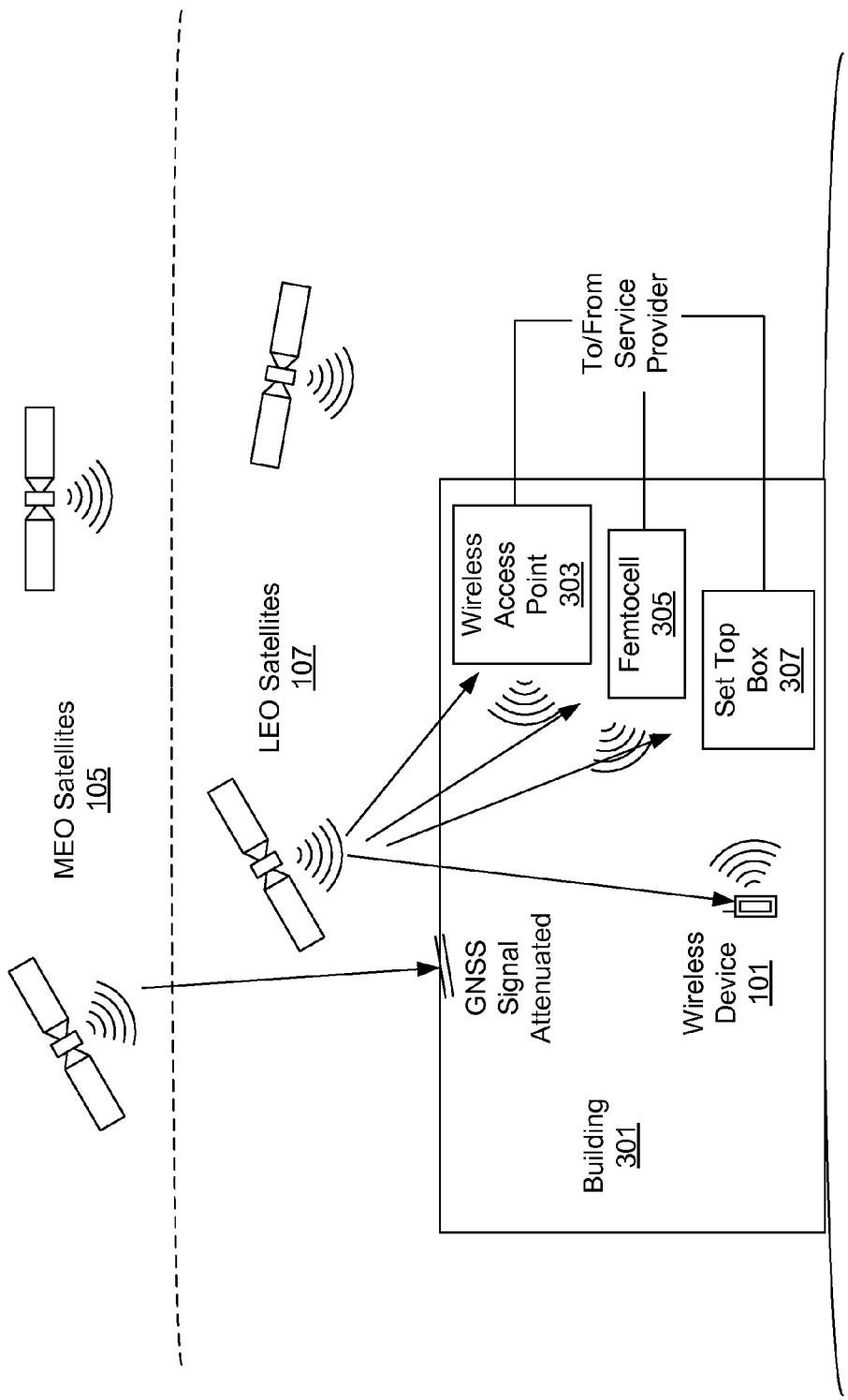
FIG. 3 is a schematic illustrating an exemplary application for a dual-mode satellite receiver, in accordance with an embodiment of the invention.

FIG. 3 is a schematic illustrating an exemplary application for a dual-mode satellite receiver, in accordance with an embodiment of the invention. Referring to FIG. 3, there are shown MEO satellites 105, LEO satellites 107, and a building 301 comprising exemplary devices such as the wireless device 101, a set-top box 307, a femtocell router 305, and a wireless access point 303. The wireless device 101, set-top box 307, femtocell router 305, and wireless access point 303 may comprise dual-mode MEO/LEO receivers such that they may receive LEO satellite signals even when MEO signals are attenuated.

In an exemplary scenario, the devices within the building 301 may not be able to lock onto MEO GNSS (e.g. GPS) signals due to attenuation of the building 301. Accordingly, the wireless device 101, set-top box 307, femtocell router 305, and wireless access point 303 may receive LEO signals, filter, down-convert, filter, convert to digital, and demodulate the signals to extract a UTC time and frequency signal. This clock extraction may enable time assist and injection for the GNSS search engine when the HNSS signal is not strong enough, generating a one pulse per second signal (1PPS).

Furthermore, these timing signals may allow the devices to accurately determine their positions by comparing signals from a plurality of satellites. For example, service providers may need to know the location of access points or femtocells that it supports, which may be more difficult if the devices are portable. By integrating a receiver that is capable of receiving both MEO (e.g. GPS) and LEO satellite signals (e.g., Iridium) for positioning purposes, the devices may accurately determine their location even from within attenuating structures, consistently or on a periodic basis, for example, and communicate this information to an appropriate service provider. This location information may be aggregated for a plurality of devices in a database that may be accessible to other users.

Figure 4:
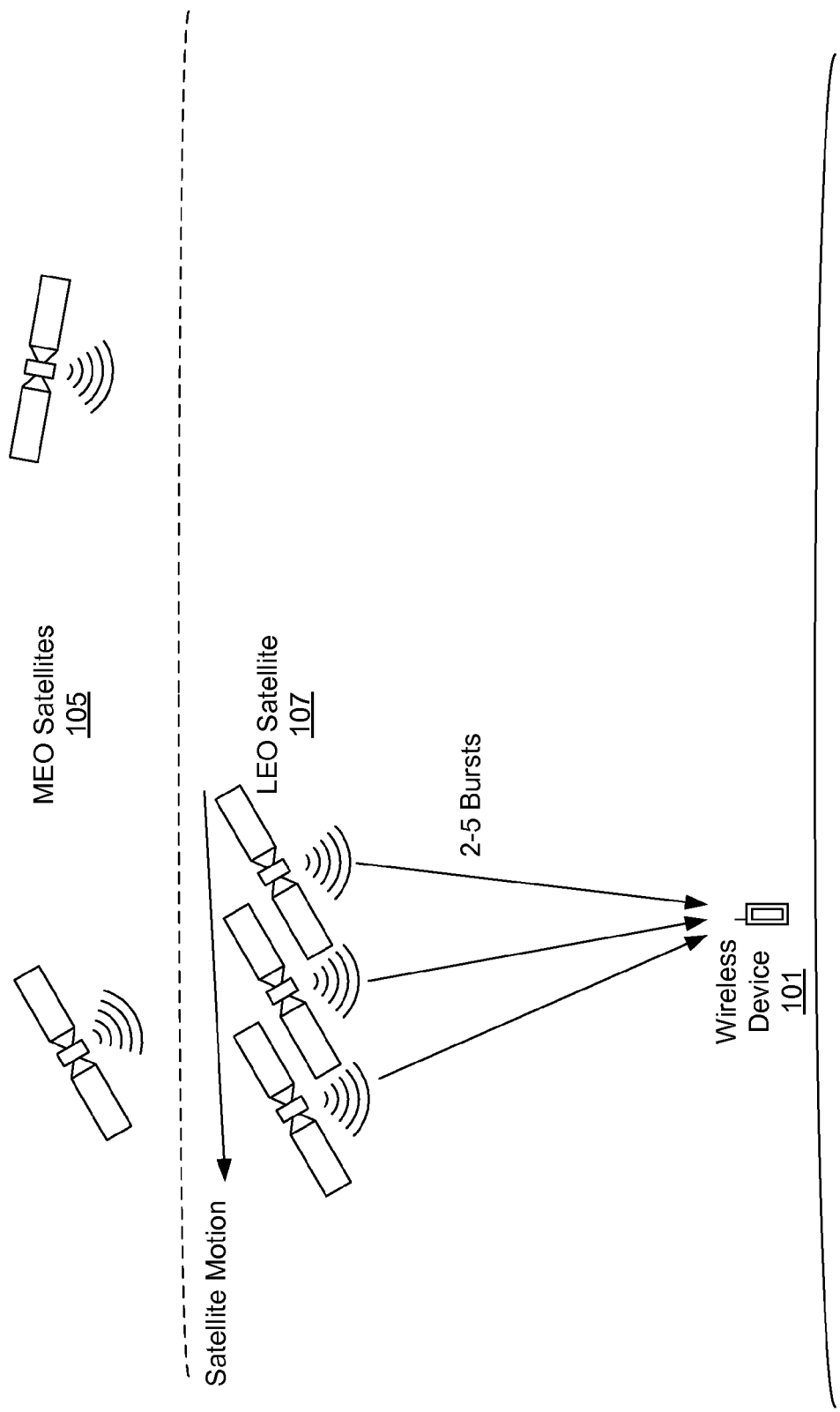
FIG. 4 is a schematic illustrating a LEO-assisted GNSS receiver hot start, in accordance with an embodiment of the invention.

FIG. 4 is a schematic illustrating a LEO-assisted GNSS receiver hot start, in accordance with an embodiment of the invention. Referring to FIG. 4, there is shown MEO satellite 105 and a LEO satellite 107 moving in the direction indicated over two time intervals. In an exemplary scenario, 2-5 bursts from the LEO satellite 107 may be received by the wireless device 101 over a few seconds. The bursts may be down-converted and de-modulated to extract an accurate clock that may calibrate the LO/PLL and/or TCXO of MEO receiver circuitry and therefore reduce the GNSS (e.g. GPS) acquisition time. Furthermore, this may enable a coarse location determination from the LEO signals and with static ephemeris data stored in the device, a GPS hot start may therefore be enabled. This may also enable lower power operation, as the GPS receiver path may be switched off or configured in a lower power mode, and quickly restarted utilizing LEO timing signals and clock source calibration.

Figure 5:
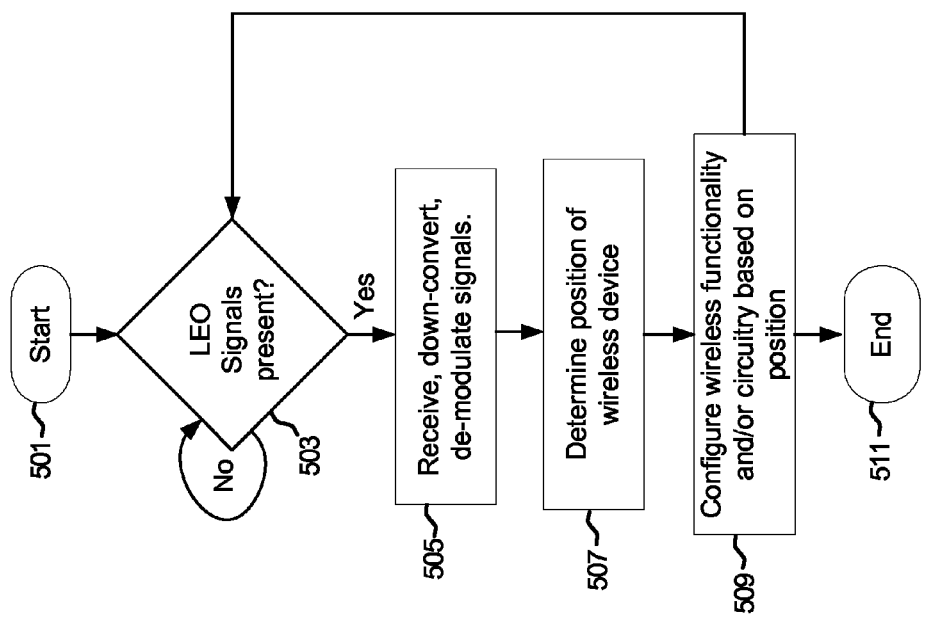
FIG. 5 is a block diagram illustrating exemplary steps for a low-Earth orbit positioning enabled receiver, in accordance with an embodiment of the invention.

FIG. 5 is a block diagram illustrating exemplary steps for a low-Earth orbit positioning enabled receiver, in accordance with an embodiment of the invention. The exemplary method illustrated in FIG. 5 may, for example, share any or all functional aspects discussed previously with regard to FIGS. 1A-4.

Referring to FIG. 5, after start step 501, in step 503, the wireless device may determine whether LEO signals are present. If yes, the exemplary steps may proceed to step 505 where the receiver may receive, down-convert, demodulate, and decode the LEO signals. In step 507, accurate timing information may be extracted from the decoded signals for calculating the position of the wireless device. The accurate clock along with known satellite data may be utilized to determine the location of the wireless device.

In step 509, the determined position of the wireless device may be utilized to configure wireless communication functionality and/or circuitry. For example, in instances when the wireless device is located in the vicinity of a known and/or trusted WiFi network, the wireless device may configure its WiFi circuitry in a powered-up state. Alternatively, when the user is not near a known and/or trusted WiFi network, the wireless device may deactivate or put the WiFi circuitry in the wireless device in a standby mode.

Similarly, if fine location determination is not needed, the wireless device may also disable its MEO (e.g. GPS) location circuitry, or put in a standby mode, during the commute between home and work. During this time, the LEO satellite signals may be utilized to determine the location of the wireless device.

Furthermore, the LEO signal-determined position of the wireless device may be utilized for POS communications. For example, the wireless device may be utilized to complete a purchase or other transaction, and may determine its position utilizing LEO signals. The position may then be encrypted, signed, and passed along with the transaction ID to a POS scanner/reader and ultimately to a bank or card service provider.

In another exemplary scenario, the LEO-determined position of the wireless device may be utilized to initiate synchronization of data acquired by the wireless device. For example, when the wireless device determines that it is within range of a home wireless network, it may automatically initiate a sync sequence of data acquired by the wireless device since its last sync. This may include data such as purchase transactions, photos, or downloaded music.

The wireless configuration step 509 may be followed by end step 511.

In an embodiment of the invention, a method and system may comprise determining a location of a wireless communication device 101 comprising a medium Earth orbit (MEO) radio frequency (RF) path 220 and a low Earth orbit (LEO) RF path 210 utilizing LEO signals received by the LEO RF path 210. A wireless communication function of the wireless communication device 101 may be configured based on the determined location.

The wireless communication function may comprise a power level of WiFi circuitry 153 in the wireless communication device 101 or a point-of-sale transaction 160. The determined location and a transaction ID for the point-of-sale transaction 160 may be stored utilizing a security processor 149 in the wireless communication device 101. The MEO RF path 220 may be powered down based on the determined location.

The wireless communication function may comprise a synchronization of data on the wireless communication device 101 with one or more devices in a home location 119 of the wireless communication device 101. The wireless communication device 101 may comprise a femtocell device 305 or a set-top box 307. In-phase and quadrature signals may be processed in the MEO RF path 220 and/or the LEO RF path 210. The wireless communication device 101 may be controlled by a reduced instruction set computing (RISC) central processing unit (CPU) 219, 267.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for global navigation satellite system configuration of wireless communication applications.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
    in a wireless communication device comprising a satellite positioning radio frequency (RF) path:
        determining a location of said wireless communication device utilizing low-Earth orbit (LEO) signals received by said satellite positioning RF path;
        establishing communications with a wireless access point based on the determined location; and
        configuring a wireless communication function of said wireless communication device based on said determined location.

2. The method according to claim 1, wherein said wireless communication function comprises a power level of wireless local area network (WLAN) circuitry in said wireless communication device.

3. The method according to claim 1, wherein said wireless communication function comprises a point-of-sale transaction.

4. The method according to claim 3, comprising storing said determined location and a transaction ID for said point-of-sale transaction utilizing a security processor in said wireless communication device.

5. The method according to claim 1, comprising powering down said satellite positioning RF path based on said determined location.

6. The method according to claim 1, wherein said wireless communication function comprises a synchronization of data on said wireless communication device with one or more devices in a home location of said wireless communication device.

7. The method according to claim 1, wherein said wireless communication device comprises a femtocell device.

8. The method according to claim 1, wherein said wireless communication device comprises a set-top box.

9. The method according to claim 1, comprising processing in-phase and quadrature signals in said satellite positioning RF path.

10. The method according to claim 1, wherein said wireless communication device is controlled by a reduced instruction set computing (RISC) central processing unit (CPU).

11. A system for wireless communication, the system comprising:
    one or more circuits for use in a wireless communication device comprising a satellite positioning radio frequency (RF) path, said one or more circuits being operable to:
        determine a location of said wireless communication device utilizing low-Earth orbit (LEO) signals received by said satellite positioning RF path;
        establish communications with a wireless access point based on the determined location; and
        configure a wireless communication function of said wireless communication device based on said determined location.

12. The system according to claim 11, wherein said wireless communication function comprises a power level of wireless local area network (WLAN) circuitry in said wireless communication device.

13. The system according to claim 11, wherein said wireless communication function comprises a point-of-sale transaction.

14. The system according to claim 13, wherein said one or more circuits are operable to store said determined location and a transaction ID for said point-of-sale transaction utilizing a security processor in said wireless communication device.

15. The system according to claim 11, wherein said one or more circuits are operable to power down said satellite positioning RF path based on said determined location.

16. The system according to claim 11, wherein said wireless communication function comprises a synchronization of data on said wireless communication device with one or more devices in a home location of said wireless communication device.

17. The system according to claim 11, wherein said wireless communication device comprises a femtocell device.

18. The system according to claim 11, wherein said wireless communication device comprises a set-top box.

19. The system according to claim 11, wherein said wireless communication device is controlled by a reduced instruction set computing (RISC) central processing unit (CPU).

20. A system for wireless communication, the system comprising:
    one or more circuits for use in a wireless communication device comprising a satellite positioning radio frequency (RF) path, said one or more circuits being operable to:
        determine a location of said wireless communication device utilizing low-Earth orbit (LEO) signals received by said satellite positioning RF path;
        establish communications with a wireless access point based on the determined location; and
        configure wireless local area network (WLAN) circuitry in said wireless communication device in an on or off state based on said determined location.

* * * * *